United States Patent [19]

Green et al.

[11] Patent Number: 5,278,719

[45] Date of Patent: Jan. 11, 1994

[54] VARIABLE DELAY REMOTE VCR PLAYBACK CONTROLLER

[75] Inventors: David W. Green; Gennady Palitsky; Clifford W. Walton, all of Louisville, Ky.

[73] Assignee: Jefferson Audio Video Systems, Inc., Louisville, Ky.

[21] Appl. No.: 782,516

[22] Filed: Oct. 25, 1991

[51] Int. Cl.$^5$ ............... G11B 15/18; G11B 17/00; G11B 19/02

[52] U.S. Cl. ............... 360/137; 360/74.1; 360/69

[58] Field of Search ............ 360/69, 71, 137, 74.1

[56] References Cited

U.S. PATENT DOCUMENTS

| | | | |
|---|---|---|---|
| 4,628,390 | 12/1986 | Motoyama et al. | 360/137 |
| 4,755,883 | 7/1988 | Uehira | 360/137 |
| 4,789,973 | 12/1988 | Mabuchi | 360/137 |
| 4,809,117 | 2/1989 | Friedman | 360/137 |
| 4,866,542 | 9/1989 | Shimada et al. | 360/71 |
| 4,924,387 | 5/1990 | Jeppesen | 364/409 |

Primary Examiner—Timothy P. Callahan
Attorney, Agent, or Firm—Middleton & Reutlinger

[57] ABSTRACT

An apparatus and method for precisely controlling the playback operations of a VCR for transcription purposes by means of a foot-operated remote control containing electronics with timing and delay circuits and programmable read-only memory to generate special sequences and combinations of control signals to the VCR, including a user-controllable variable delay interval function for varying the execution of two or more sequential VCR operations.

16 Claims, 4 Drawing Sheets

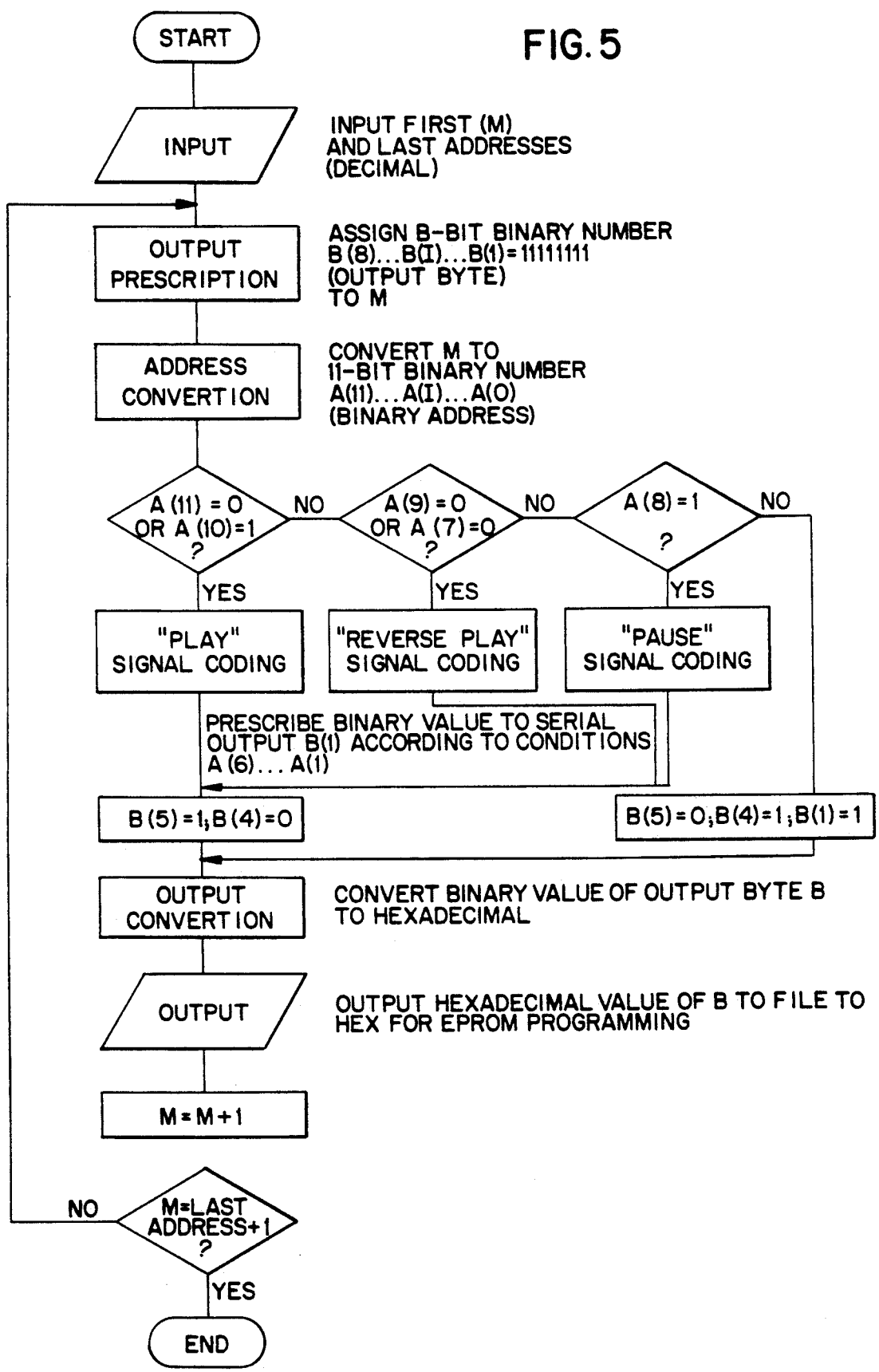

VARIABLE DELAY REMOTE VCR PLAYBACK CONTROLLER

BACKGROUND OF THE INVENTION

This invention relates to an apparatus and method for remotely controlling the operation of a video cassette recorder ("VCR") by means of electronics and imbedded software that generate multiple control signals separated by variable delay periods. More particularly, the present invention relates to a variable delay remote control means for precisely playing back audio-video tapes for the purpose of preparing a written transcription thereof. Even more particularly, the present invention relates to a foot-operated pedal for controlling VCR review and playback operations with a sufficient degree of accuracy for making a written transcription from an audio-video tape recording of court proceedings.

In recent years, a number of state and federal courts have begun making audio-video tape recordings of judicial proceedings, such as, for example, trials, hearings, or depositions, by means of multiple sound-activated cameras located strategically throughout the courtroom. In addition, depositions and witness statements are sometimes taken by using a video tape recorder. An audio-video tape recording eliminates the need for a court reporter to be physically present at the time of the proceeding to take shorthand or use a transcriptor machine to make an official record.

Many courts rely upon the audio-video tape recording as the official court record, so in the event of an appeal or other post-trial activity, lawyers find it useful to have a written transcription prepared from the audio portion of the tape. Thus, a court reporter or other skilled person listens to and watches the tape to transcribe the spoken words into a written document. Typically, the court reporter is operating a transcriptor machine with both hands while watching and listening to the tape. If something is missed or the speaker is talking too fast, the court reporter must stop transcribing in order to manually stop, rewind, search and replay portions of the tape.

Initial efforts to attach a simple foot-operated or hand-operated remote switch to a VCR, such as the device taught by U.S. Pat. No. 4,809,117 ("Freedman"), were not satisfactory because they were cumbersome and inaccurate. The Freedman device merely teaches having a viewer remotely operate certain standard VCR functions, such as fast forward, slow motion, freeze frame, and rewind. While the degree of precision taught by the Freedman device might be adequate for athletic instructional purposes, it does not provide the precision required for transcription purposes, where a reporter must often review the enunciation of a single word, phrase, or sentence multiple times before it is understood. Thus, a more precise means of reviewing VCR tapes was needed.

U.S. Pat. No. 4,924,387 ("Jeppesen") teaches a method of concurrently preparing a video and written record of court proceedings. However, Jeppesen merely teaches the electronic synchronization of the audio-video record of the proceedings with a written record which is manually transcribed in real time during court, whereas the present invention provides a means to assist a court reporter or stenographer in preparing the transcription of the video record after the actual proceedings have occurred.

The shortcoming of the prior art is that a court reporter who is preparing a transcription from a previously recorded tape is not able to accurately and predictably stop and start the VCR at precise points on the tape. For example, when it becomes necessary to pause the tape to "catch up" with the conversation or the court reporter needs to review a word or phrase which was missed, a high degree of precision together with foot-operated control is needed. Further, VCR controls, whether operated on the front panel of the machine or remotely by hand or foot controls, typically cause clipped words and phrases when paused and replayed. Thus, standard remote VCR controls do not meet the special requirements of court reporters for transcription purposes.

SUMMARY OF THE INVENTION

The present invention provides an apparatus and method for remotely reviewing, pausing or playing a VCR tape with a high degree of precision by generating the appropriate VCR control signals to cause the desired function.

Furthermore, the present invention teaches an apparatus and method for precisely controlling the operations of a VCR for review purposes by means of electronics which contain timing and delay circuits and programmable read-only memory designed to generate special combinations of control signals for the VCR.

Even further, the present invention provides an apparatus and method whereby a court reporter can listen to and watch an audio-video tape recording of a judicial proceeding for purposes of producing a written record thereof, where the reporter has the ability to review, pause and play the tape with a high degree of sensitivity by use of a foot-operated pedal capable of sending a combination of control signals to the VCR.

More particularly, the present invention provides an apparatus and method for reviewing, pausing and playing audio-video tape recordings by a VCR using a remotely controlled foot-operated pedal, with electronics comprising: a timing means for driving the system clock; a serial code generator means for activating the VCR; a pause delay means for sequentially activating the reverse-play and pause modes; a review delay means for sequentially activating the reverse-play and play modes; a play means for activating the play mode; and an interface means for electrically connecting to the VCR.

Even more particularly, the present invention provides a method for precise control of VCR operations by means of a foot-operated pedal, comprising the steps of: (a) causing a first contact closure from the review pedal to initiate a review-delay means, which supplies two signals to the serial code generator, where the first review-delay signal causes the serial code generator to activate the reverse-play mode of the VCR and, after a first adjustable delay interval, a second review-delay signal causes the serial code generator to activate the play mode of the VCR, and where the second review-delay signal may be delayed for a longer time by the continuous closure of the review pedal, thereby activating the VCR in continuous reverse-play mode until the review pedal is released; (b) causing a second contact closure from the pause pedal to initiate the pause-delay means, which supplies two signals to the serial code generator means, where the first pause-delay signal causes the serial code generator to activate the reverse-play mode of the VCR and, after a second adjustable delay interval, a second pause-delay signal causes the serial code generator to activate the pause mode of the VCR, and where the second pause-delay signal may be delayed for a longer time by the continuous closure of the pause pedal, thereby activating continuous reverse-play mode on the VCR until the pause pedal is released; (c) causing a third contact closure from the play pedal to directly cause the serial code generator to activate the play mode on the VCR; (d) providing a timing circuit means to provide clock pulses for the operation of the serial code generator, whereby the clock parameters may be set to a baud rate corresponding to the serial code controls used by the VCR; and (e) executing instructions within the serial code generator to test the occurrence of certain input conditions.

BRIEF DESCRIPTION OF THE DRAWINGS

A better understanding of the present invention will be had upon reading the following description in conjunction with the accompanying drawings, wherein:

FIG. 5 is a flowchart of the program embodied into the electronics of the present invention.

DETAILED DESCRIPTION OF THE PREFERRED EMBODIMENT

1. Overview

Figure 1:
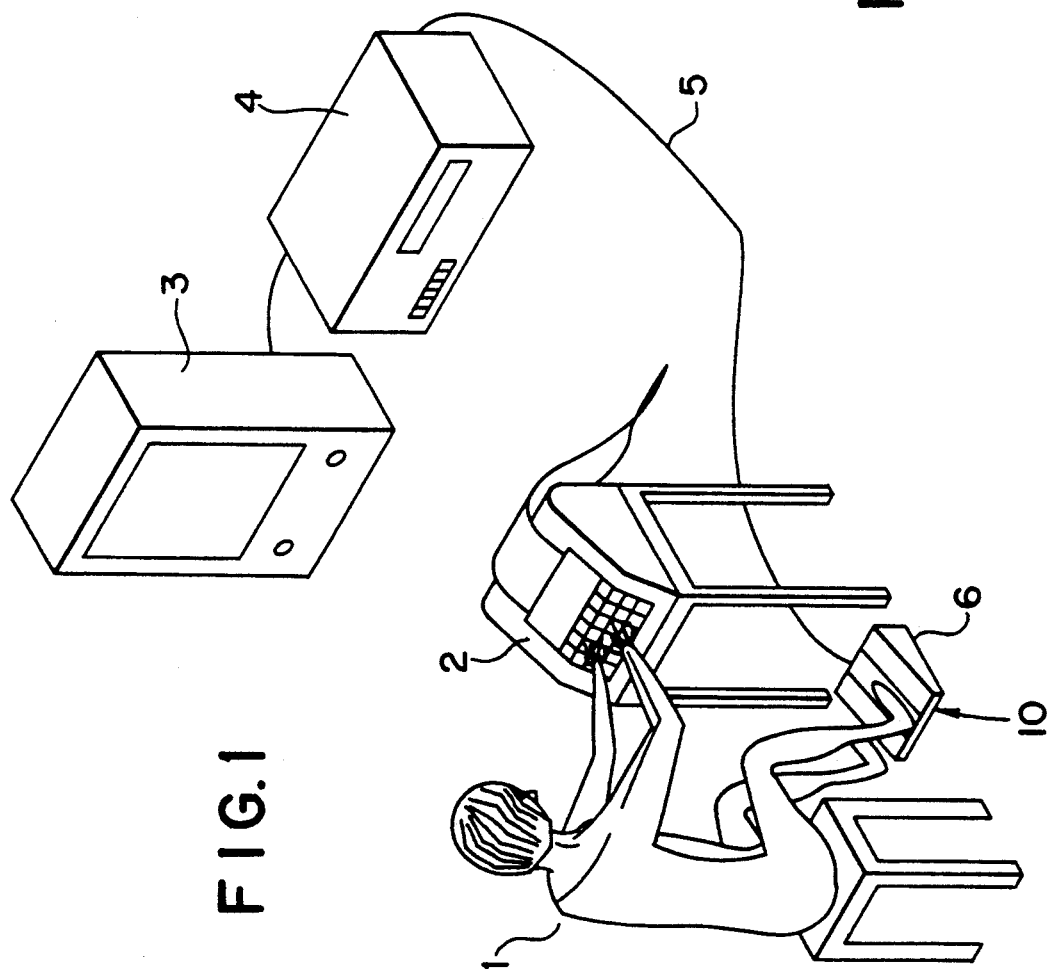
FIG. 1 is a perspective view of an operator using the foot-operated pedal embodied in the present invention.
Figure 2:
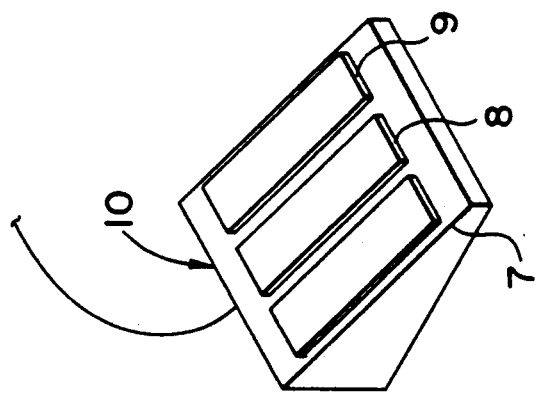
FIG. 2 is a perspective view of the foot-operated pedal embodied in the present invention.

FIG. 1 depicts an operator 1, such as, for example, a court reporter, using a foot-operated VCR controller 10 embodied in the present invention. The operator 1 is typing upon a transcriptor machine 2 while watching and listening to a television 3 that is connected to a VCR 4. The VCR 4 is electrically connected by a cable 5 to a foot controller 6, upon which the operator's right foot is resting. The foot controller 6, as shown in detail in FIG. 2, actually has three separate pedals for controlling different VCR functions, namely the pause pedal 7, the review pedal 8, and the play pedal 9.

Figure 3:
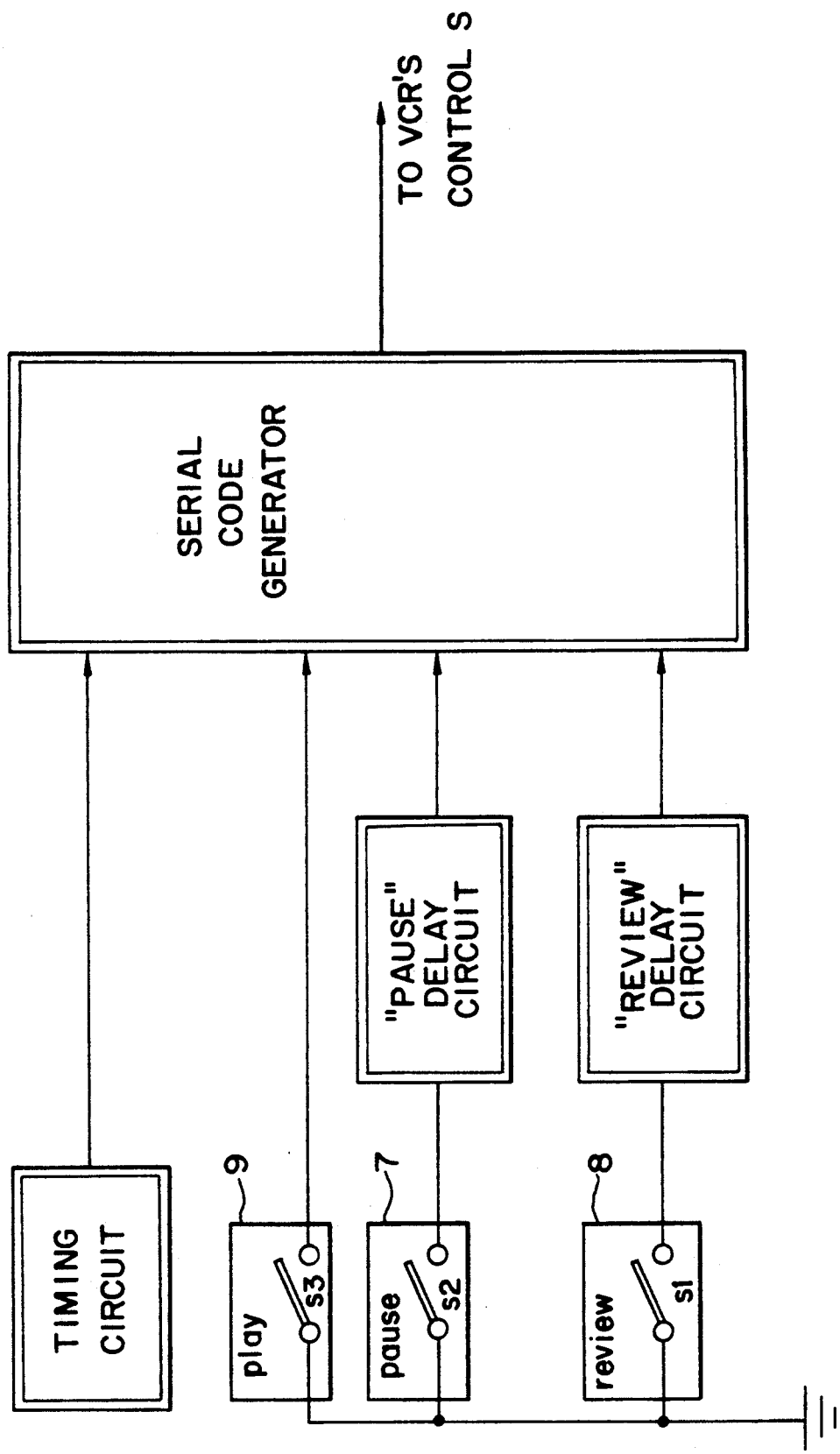
FIG. 3 is a block diagram of the primary elements of an embodiment of the present invention.

FIG. 3 is a simplified block diagram of the invention. The three contact switches labeled in FIG. 3 correspond to the foot pedals 7–9 identified above. The timing circuit is used by the serial code generator to determine when certain time intervals have occurred. In operation, the review-delay circuit is activated by a contact closure of the review pedal 8, which causes the serial code generator to send reverse-play and play control signals to the VCR. Likewise, the pause-delay circuit is activated by a contact closure of the pause pedal 7, which causes the serial code generator to send reverse-play and pause control signals to the VCR. Lastly, a contact closure of the play pedal 9 causes the serial code generator to send a play control signal to the VCR.

2. Electronics

Figure 4:
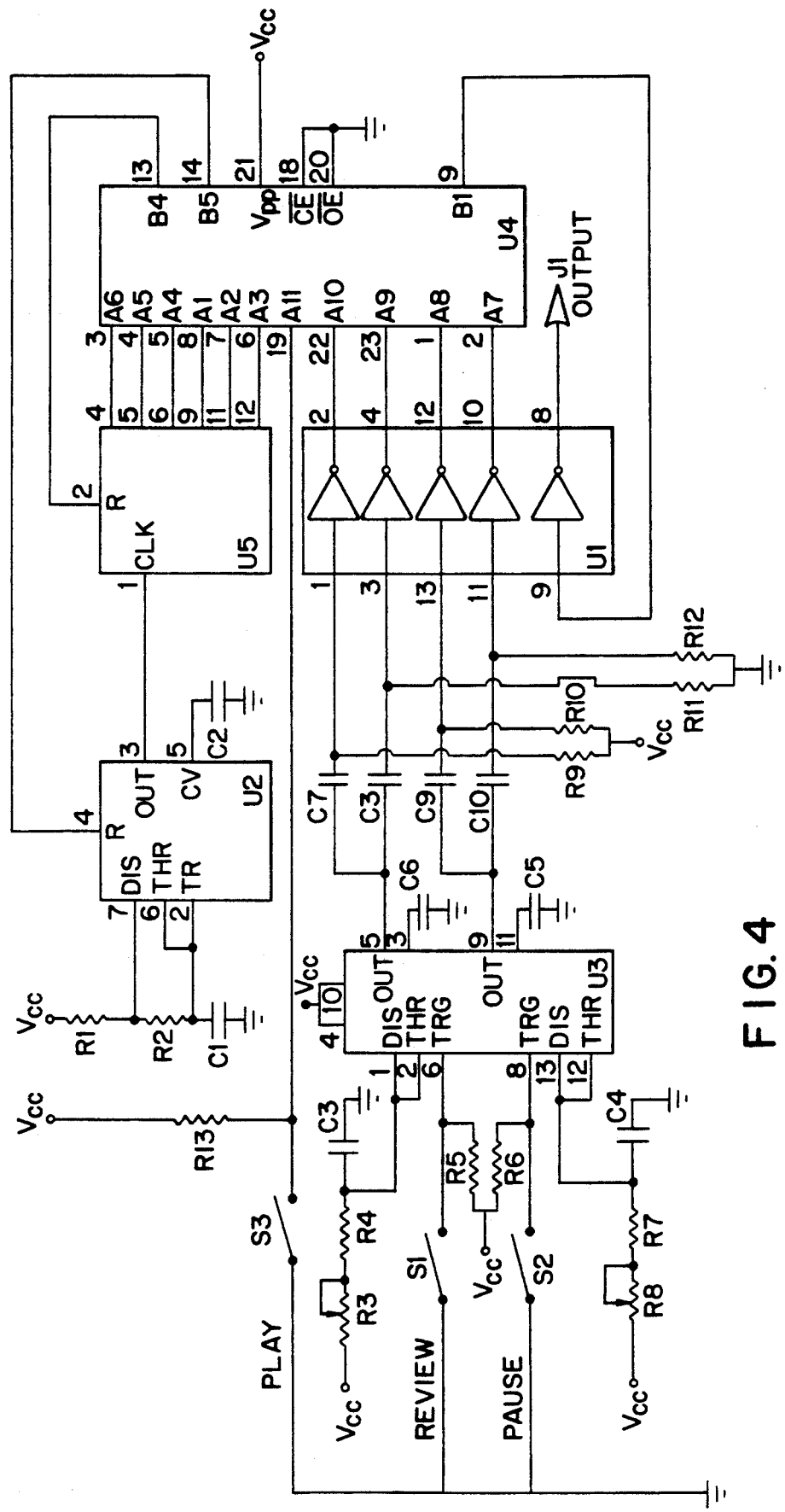
FIG. 4 is a schematic diagram showing the electronics of an embodiment of the present invention.

FIG. 4 shows a schematic diagram of the electronic circuit connectivity of the present invention. The purpose of the electronics is to produce the desired VCR binary control signals in response to selected VCR functions. Depending upon the software embodied in the electronics, the present invention can produce digital control signals for any VCR. However, this description will detail how the desired binary control signals are produced for a SONY VCR, such as, for example, the SONY Model SVO-160.

A SONY VCR expects a 2.4 msec start pulse followed by a function control code and a device code. The SONY "zero" pulse lasts 1.2 msec and the SONY "one" pulse lasts 1.8 msec. Thus, SONY signals may not have the same pulse length. For clarity, the following description details the binary bit string generated by the electronics of the present invention with each bit lasting 0.6 msec. Accordingly, a SONY "zero" pulse is shown as a binary 01 (1.2 msec), while a "one" pulse is shown as a binary 011 (1.8 msec) and the start pulse is shown as a binary 1111 (2.4 msec). The control signals of interest for the present invention represent the following functions: pause, reverse-play, and play. For these functions, the electronics will generate the following bit strings:

| Function | Binary Bit Stream Generated |
|---|---|
| Reverse-Play | 1111010101010110110101101101101101 |
| Pause | 111101101010110110101011011010101101 |
| Play | 1111010110101101101010110110101101 |

Thus, in SONY pulse terminology, these binary bit strings for the three control codes are represented as follows: reverse-play is 0000110, pause is 1001100, and play is 0101100. The binary representation for the SONY device code is 11010.

Referring back to FIG. 4, a foot-operated controller 10 contains three foot switches, S1, S2, and S3, which are normally open. The operator, by pressing one of the foot pedals 7, 8, or 9, will close one of the switches, S2, S1 or S3, respectively. Switch S1 controls the function called REVIEW (hereinafter, functions of the present invention will appear in all upper case letters to distinguish them from similarly named VCR modes of operation), switch S2 controls the function called PAUSE and switch S3 controls the function called PLAY.

The REVIEW function activated by switch S1 is designed to allow an operator who is transcribing a tape to backup the tape for at least a first preset time period, which has been set by adjusting resister R3, in order to relisten to the last played portion of the tape. In operation, when switch S1 is closed by the operator, a reverse-play control signal is generated, followed by a play control after expiration of the first preset time period. In practice, reversing the tape for approximately four (4) seconds is optimal because the operator is able to hear again the last few words or sentence spoken. In addition, if the operator holds switch S1 closed for a period longer than the first preset time period, the electronics of the present invention will delay generating the control signal for the VCR play mode until the operator lifts his foot off pedal 8, thereby opening switch S1.

The PAUSE function activated by switch S2 is designed to allow an operator who is transcribing a tape to take the tape out of the play mode to catch up with the transcription. By pressing the Pause pedal 7, the tape is automatically backed up for a second preset time period which can be adjusted by adjustable resistor R8. In operation, when switch S2 is closed by the operator, a reverse-play control signal is generated, followed by a pause control signal after expiration of the second preset time period. In practice, reversing the tape for approximately two (2) seconds seems optimal because the operator is able to hear again the last word spoken and can be sure nothing was clipped. In addition, if the operator holds switch S2 closed for a period longer than the second preset time period, the electronics of the present invention will delay generating the pause control signal until the operator lifts her foot off pedal 7, thereby opening switch S2.

The PLAY function has a straightforward purpose and is simply designed to allow the operator to start playing the VCR tape using a remote foot-operated pedal 9. When the operator closes switch S3, the electronics of the present invention generate the control signal for the play function.

With further reference to FIG. 4, the electronic circuitry of one embodiment of the present invention is further described. Five different off-the-shelf integrated circuits are utilized. A Hex Inverting Schmitt Trigger having the characteristics of a National Semiconductor MM74HC14N is identified by U1. A Timer having the characteristics of a National Semiconductor LM555CN is identified by U2. A Dual Timer having the characteristics of a National Semiconductor LM556CN is identified by U3. A 16,384-Bit (2048×8) UV Erasable CMOS PROM having the characteristics of a National Semiconductor NMC27C16Q is identified by U4. EPROM U4 inputs are identified as A1–A11 and outputs are B1–B8. A 7-Stage Ripple Carry Binary Counter having the characteristics of a National Semiconductor CD4024BE is identified by U5.

The binary bit streams, or control signals, are provided to the VCR through output jack J1 shown in FIG. 4. Depending upon the VCR model selected, the output can be hardwired directly, or in the case of the SONY model mentioned above, to the "Control S" input jack. To eliminate any hardwiring requirement, other standard remote control technologies can be utilized, such as, for example, infrared transmission.

To aid in understanding the operation of the electronic circuit shown in FIG. 4, the invention's PAUSE function will be described. Those skilled in the art will see that the PAUSE and REVIEW functions operate similarly. That is, the PAUSE function causes a reverse-play control signal, followed by a pause control signal after at least a second preset delay interval. The REVIEW function is implemented the same way as PAUSE except that the VCR goes into the play mode rather than pause mode after a first preset delay interval. Also, the first and second adjusted delay intervals may be different for PAUSE and REVIEW, with the PAUSE delay interval being adjusted by R8 and the REVIEW delay interval by R3.

When the operator presses on the PAUSE pedal 7, switch S2 is closed and a negative transition (ground) appears on trigger input pin 8 of monostable multivibrator U3. This causes a positive pulse at output pin 9 of U3. Minimum pulse duration at output pin 9 of U3 is controlled by resistors R7 and R8 and capacitor C4 and is usually set for about two seconds, but can be easily changed by adjusting R8 (Note: for the REVIEW function, the first delay interval is usually about 4 seconds but may be adjusted by R3). If the operator keeps switch S2 closed for a period longer than the minimum pulse duration, the output at pin 9 of U3 will remain positive until switch S2 is opened, thereby removing the ground from input pin 8 of U3. The start of the positive pulse at output pin 9 of U3 causes a short positive pulse of about 0.5 sec on EPROM U4 input A8 which generates appropriate levels at U4 outputs B4 and B5 which enable a stable multivibrator U2 and binary 7-bit counter U5, which together act as the system clock.

Multivibrator U2 has a period of 0.6 msec. The appearance of inputs on EPROM U4 inputs A1–A6 and a high level on input A8 result in the generation of the binary bit stream for reverse-play. As discussed previously, each bit has a pulse length of 0.6 msec. The serial bit string appears at output B1 of EPROM U4. After the minimum pulse duration controlled by R7, R8, and C4, or upon the opening of switch S2 (if closed for longer than the minimum pulse duration), output 9 of U3 goes negative, which causes a short negative pulse on input A7 of EPROM U4 resulting in appropriate outputs at B4 and B5 of EPROM U4 resulting in generation of the binary bit stream for the VCR's pause mode.

3. Software

In FIG. 4, EPROM U4 contains programs which are compiled and loaded into the chip's eraseable read only memory using a conventional EPROM programmer device, such as, for example, the Tribal Microsystems model TUP-300. FIG. 5 is a flowchart showing the logic used in the software upon receipt of signals from U4 input pins A7–A11. Receipt of a low voltage signal may be represented by the number 0 or "off," and a high voltage signal may be represented by the number 1 or "on." If pin A10 is on or pin A11 is off, then the VCR binary bit stream for play mode is output to B1 according to timing conditions defined by A1–A6. If either pin A7 or pin A9 is off, then the VCR binary bit stream for reverse-play mode is output to B1 according to timing conditions defined by the A1–A6. Or, if pin A8 is on, the VCR binary bit stream for pause mode is output to B1 according to timing conditions defined by A1–A6. Further, if any of the above three conditions have occurred, the timer U4 is enabled by turning B5 on and turning B4 off; otherwise the timer U4 is disabled by turning B5 off and turning both B1 and B4 on.

The foregoing detailed description is given primarily for the clearness of understanding and no unnecessary limitations are to be understood therefrom for modifications can be made by those skilled in the art reading this disclosure and may be made without departing from the spirit of the invention and scope of the appended claims herein.

The invention claimed is:

1. An apparatus for remotely controlling a VCR, comprising:
    (a) means to select one or more VCR control functions, wherein at least one of said VCR control functions will cause at least two sequential VCR operations,
    (b) means to generate one or more VCR control signals for each of said control functions, said generation means generating at least two sequential control signals for any one of said VCR control functions which will cause at least two sequential VCR operations, and
    (c) means to provide said one or more VCR control signals generated in response to the selected VCR control function to said VCR, and
    (d) means to introduce a minimum delay between said VCR control signals when one of said VCR control functions causes at least two VCR operations in sequence.

2. The apparatus of claim 1, wherein said minimum delay is adjustable.

3. The apparatus of claim 1, wherein said minimum delay may be different for each of said VCR control functions which cause at least two VCR operations in sequence.

4. The apparatus of claim 1, wherein one of said VCR control functions is a review function, which, when selected by said selection means, causes said generation means to generate a VCR reverse play control signal sequentially followed by a play control signal.

5. The apparatus of claim 4, further comprising a means to introduce a first minimum delay between said VCR reverse play control signal and said VCR play control signal.

6. The apparatus of claim 5, wherein said selection means can introduce delay greater than said first minimum delay between said VCR reverse play control signal and said VCR play control signal.

7. The apparatus of claim 1, wherein one of said VCR control functions is a pause function, which, when selected by said selection means, causes said generation means to generate a VCR reverse play control signal sequentially followed by a pause control signal.

8. The apparatus of claim 7, further comprising a means to introduce a second minimum delay between said VCR reverse play control signal and said VCR pause control signal.

9. The apparatus of claim 8, wherein said selection means can introduce delay greater than said second minimum delay between said VCR reverse play control signal and said VCR pause control signal.

10. The apparatus of claim 1, wherein one of said VCR control functions is a play function, which, when selected by said selection means, causes said generation means to generate a VCR play control signal.

11. The apparatus of claim 1, wherein said means to select one or more VCR control functions comprises a foot pedal containing at least one foot operated switch.

12. The apparatus of claim 1, wherein said means to select one or more VCR control functions comprises a hand control containing at lest one hand operated switch.

13. The apparatus of claim 1, wherein said means to generate at least one VCR control signal for each of said VCR control functions comprises a timing circuit and a programmable serial code generator having multiple inputs and an output, said inputs in communication with said selection means, said programmable serial code generator sending one or more VCR control signals in response to said control function selected, said VCR control signals being a binary bit strings, the period of each bit being determined buy said timing circuit.

14. The apparatus of claim 1, where the means to provide control signals to the VCR is a wire.

15. The apparatus of claim 1, where the means to provide control signals to the VCR is infrared light.

16. A method for remotely controlling VCR functions, comprising the steps of:
  (a) selecting one of said one or more VCR control functions, wherein at least one of said VCR control functions which can be selected will cause at least two sequential VCR operations,
  (b) generating at least one VCR control signal for each of said VCR control functions, said generation means generating at least two sequential control signals for any one of said VCR control functions which will cause at least two sequential VCR operations,
  (c) providing said at least one VCR control signal generated in response to the selected VCR control function to said VCR, and
  (d) introducing a minimum delay between said VCR control signals when one of said VCR control functions causes at least two VCR operations in sequence.

* * * * *

UNITED STATES PATENT AND TRADEMARK OFFICE
CERTIFICATE OF CORRECTION

PATENT NO. : 5,278,719

DATED : January 11, 1994

INVENTOR(S) : David W. Green; Gennady Palitsky; Clifford W. Walton

It is certified that error appears in the above-identified patent and that said Letters Patent is hereby corrected as shown below:

Column 4 Line 64 delete "PAUSE" and insert --Pause--.

Column 8 Line 6 (Claim 12) delete "lest" insert --least--

Column 8 Line 17 (Claim 13) delete "buy" insert --by--

Signed and Sealed this

Thirtieth Day of August, 1994

*Attest:*

BRUCE LEHMAN

*Attesting Officer*  *Commissioner of Patents and Trademarks*